(12) United States Patent
Yang et al.

(10) Patent No.: US 11,144,209 B2
(45) Date of Patent: *Oct. 12, 2021

(54) METHOD, APPARATUS AND COMPUTER PROGRAM PRODUCT FOR MANAGING INPUT/OUTPUT

(71) Applicant: Dell Products L.P., Round Rock, TX (US)

(72) Inventors: Lifeng Yang, Beijing (CN); Xinlei Xu, Beijing (CN); Liam Li, Beijing (CN); Ruiyong Jia, Beijing (CN); Yousheng Liu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,791

(22) Filed: Jul. 2, 2020

(65) Prior Publication Data

US 2020/0333955 A1    Oct. 22, 2020

Related U.S. Application Data

(63) Continuation of application No. 16/176,301, filed on Oct. 31, 2018, now Pat. No. 10,740,001.

(30) Foreign Application Priority Data

Jan. 18, 2018 (CN) .......................... 201810049787.9

(51) Int. Cl.
*G06F 3/06* (2006.01)

(52) U.S. Cl.
CPC ............ *G06F 3/061* (2013.01); *G06F 3/0659* (2013.01); *G06F 3/0689* (2013.01)

(58) Field of Classification Search
CPC ...... G06F 3/061; G06F 3/0689; G06F 3/0659; G06F 13/18; G06F 13/20
See application file for complete search history.

(56) References Cited

U.S. PATENT DOCUMENTS

| 8,949,555 | B1 | 2/2015 | Karamcheti et al. |
| 10,437,758 | B1 | 10/2019 | Mathews et al. |

(Continued)

OTHER PUBLICATIONS

Wikipedia, "I/O Request Packet," https://en.wikipedia.org/wiki/I/O_request_packet, Jun. 21, 2018, 1 page.

*Primary Examiner* — Hiep T Nguyen
(74) *Attorney, Agent, or Firm* — Ryan, Mason & Lewis, LLP

(57) ABSTRACT

Embodiments of the present disclosure provide a method, an apparatus and a computer program product for managing an input/output (I/O). The method comprises, in response to receiving a first I/O request of a first type for a storage device, determining whether there exists at least one credit available to the first type of I/O requests. Each of the at least one credit indicates I/O processing capability reserved by the storage device for the first type of I/O requests. The method further comprises allocating a first credit to the first I/O request based on a result of the determining. The method further comprises performing, by using the first credit, an I/O operation requested by the first I/O request on the storage device. Moreover, the method further comprises, in response to completion of the I/O operation, recycling the first credit for use by a subsequent I/O request. Embodiments of the present disclosure can implement dynamic allocation of I/O processing capability for different types of I/Os.

20 Claims, 5 Drawing Sheets

(56) References Cited

U.S. PATENT DOCUMENTS

| | | | |
|---|---|---|---|
| 10,740,001 B2* | 8/2020 | Yang | G06F 3/0689 |
| 2005/0257012 A1 | 11/2005 | Hughes | |
| 2007/0050564 A1* | 3/2007 | Gunna | G06F 12/0831 |
| | | | 711/146 |
| 2013/0054901 A1 | 2/2013 | Biswas et al. | |
| 2015/0269032 A1* | 9/2015 | Muthyala | G06F 3/0607 |
| | | | 707/639 |
| 2017/0199765 A1 | 7/2017 | Ahn et al. | |

* cited by examiner

METHOD, APPARATUS AND COMPUTER PROGRAM PRODUCT FOR MANAGING INPUT/OUTPUT

RELATED APPLICATION(S)

The present application is a continuation of U.S. patent application Ser. No. 16/176,301, filed Oct. 31, 2018 and entitled and entitled "Method, Apparatus and Computer Program Product for Managing Input/Output," which is incorporated by reference herein in its entirety. The present application also claims priority to Chinese Patent Application No. 201810049787.9, filed Jan. 18, 2018 and entitled "Method, Apparatus and Computer Program Product for Managing Input/Output," which is incorporated by reference herein in its entirety.

FIELD

Embodiments of the present disclosure generally relate to the field of data storage, and more specifically, to methods, apparatus and computer program products for managing an input/output (I/O).

BACKGROUND

In a storage system, there may be different types of I/Os for a given storage device. For example, important configuration information (such as status information of various components or the like) of the storage system and user data may be stored on the same storage device. An I/O for the important configuration information and an I/O for the user data typically have different priorities. The configuration information of the storage system is of critical importance for the storage system, and data loss in the configuration information may probably result in serious problems. Therefore, an I/O for the important configuration information usually has a higher priority than an I/O for the user data. In other words, the performance of the I/O for the configuration information must be guaranteed, i.e., the I/O must be completed within the required time and the throughput thereof must be guaranteed.

SUMMARY

Embodiments of the present disclosure provide methods, apparatus and computer program products for managing an I/O.

In a first aspect of the present disclosure, a method of managing an I/O is provided. The method comprises: in response to receiving a first I/O request of a first type for a storage device, determining whether there exists at least one credit available to the first type of I/O requests, each of the at least one credit indicating I/O processing capability reserved by the storage device for the first type of I/O requests; allocating a first credit to the first I/O request based on a result of the determining; performing, by using the first credit, an I/O operation requested by the first I/O request on the storage device; and in response to completion of the I/O operation, recycling the first credit for use by a subsequent I/O request.

In a second aspect of the present disclosure, an apparatus for managing an I/O is provided. The apparatus comprises at least one processing unit and at least one memory. The at least one memory is coupled to the at least one processing unit and stores instructions for execution by the at least one processing unit. The instructions, when executed by the processing unit, cause the apparatus to perform acts. The acts include: in response to receiving a first I/O request of a first type for a storage device, determining whether there exists at least one credit available to the first type of I/O requests, each of the at least one credit indicating I/O processing capability reserved by the storage device for the first type of I/O requests; allocating a first credit to the first I/O request based on a result of the determining; performing, by using the first credit, an I/O operation requested by the first I/O request on the storage device; and in response to completion of the I/O operation, recycling the first credit for use by a subsequent I/O request.

In a third aspect of the present disclosure, a computer program product is provided. The computer program product is tangibly stored in a non-transient computer storage medium and includes machine executable instructions. The machine executable instructions, when executed by an apparatus, cause the apparatus to perform any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description of the example embodiments of the present disclosure with reference to the accompanying drawings, the above and other objectives, features, and advantages of example embodiments of the present disclosure will become more apparent. In the example embodiments of present disclosure, the same reference numerals usually represent the same components.

Throughout the drawings, the same or similar reference numerals refer to the same or similar elements.

DETAILED DESCRIPTION

Figure 1:
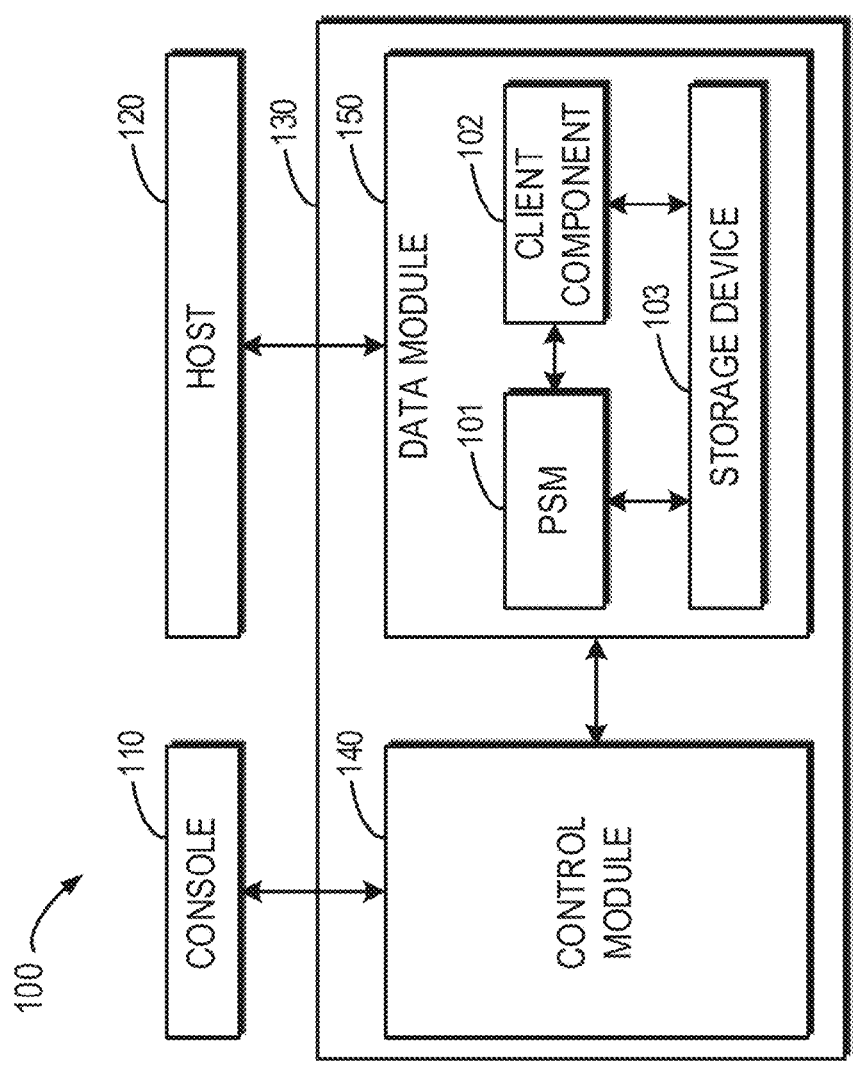
FIG. 1 illustrates an architecture diagram of a storage system 100 according to embodiments of the present disclosure.

Preferred embodiments of the present disclosure will now be described in detail with reference to the accompanying drawings. Although the drawings show preferred embodiments of the present disclosure, it should be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one embodiment" and "the embodiment" are to be read as "at least one embodiment." The term "another embodiment" is to be read as "at least another embodiment." The terms "first," "second," and the like may refer to different or the same objects. Other definitions, either explicit or implicit, may be included below.

As stated above, in a storage system, there may be different types of I/Os for a given storage device. In order to ensure the performance of an I/O with a higher priority, the storage device may reserve more I/O processing capability for the I/O with a higher priority but less I/O processing capability for an I/O with a lower priority, thereby ensuring that the I/O with the higher priority can be completed within the required time and have a high throughput.

In a legacy solution, such a reservation is usually unchanged. That is, there is a fixed proportion between I/O processing capability reserved for the I/O with the higher priority and that reserved for the I/O with the lower priority. In this way, in case that important configuration information of the storage system and user data are stored on the same storage device, even though the I/Os for configuration information are not busy, the I/Os for the user data are still unable to obtain the I/O processing capability of the I/Os for the configuration information, and thus are kept at a low performance level all the time.

When the storage device is a redundant array of independent disks (RAID) constructed based on a number of disks, the above problem may be more serious.

For example, when the storage device is a mapped RAID, the configuration information and a part of the user data may be stored together in one or more disk extents, which may be distributed across a plurality of disks. Due to the above reasons, the I/Os for the part of the user data stored together with the configuration information may probably remain at a low performance level all the time and are thus also referred to as "slow I/Os." On the other hand, other user data than the above user data may be stored in other disk extents, which may also be distributed across the plurality of disks. The I/Os for the other user data which is not stored together with the configuration information may be assigned more I/O processing capability and thus remain at a high performance level, and they are also referred to as "fast I/Os". It can be seen that, in case that the storage device is a mapped RAID, since the slow I/Os and the fast I/Os may be actually directed to the same physical disk, congestion of the fast I/Os by the slow I/Os may occur. That is, the slow I/Os may cause the performance of the fast I/Os to degrade, thereby reducing the performance of the entire storage system.

Example embodiments of the present disclosure provide a solution for managing I/Os. The solution can implement dynamic allocation of I/O processing capability for different types of I/Os. By allocating, for I/Os with lower priorities, at least part of the I/O processing capability reserved for I/Os with higher priorities if they are not busy, the solution can improve the processing performance of the I/Os for the user data stored on the same storage device as the configuration information, thereby improving the performance of the entire storage system. FIG. 1 illustrates an architecture diagram of a storage system 100 according to embodiments of the present disclosure. As shown in FIG. 1, the storage system 100 generally includes a console 110, a host 120 and a storage processor (SP) 130. The SP 130 may include a control module 140 and a data module 150. The data module 150 may include a persistent storage manager (PSM) 101, one or more components 102 (also referred to as "client components" herein) that operate the PSM 101 and a storage device 103. It is to be understood that the structure and functions of the storage system 100 as shown in FIG. 1 are only for purpose of illustration, without suggesting any limitations to the scope of the present disclosure. Embodiments of the present disclosure can be embodied in different structures and/or functions.

In some embodiments, the PSM 101 may be a driver, which allows the one or more client components 102 to persistently store respective configuration information in specified storage areas in the storage device 103. In some embodiments, the PSM 101 may provide a database interface (for example, a kernel database manager (KDBM)) to implement such storage.

In some embodiments, the storage device 103 may be constructed based on any nonvolatile storage medium currently known or to be developed in the future, examples of which include, but are not limited to, one or more disks, solid-state disks (SSD), disk arrays, or the like. The storage device 103 may be a logical or physical storage device. In the following description, a redundant array of independent disks (RAID) is taken as an example of the storage device 103. However, it is to be understood that this is only for the purpose of illustration, without suggesting any limitations to the scope of the present disclosure in any manner.

In some embodiments, examples of the one or more client components 102 may include, but are not limited to, a host module for interfacing with the host 120, a user logical unit number module for providing logical storage units, a file system module for providing file system interfaces, a dynamic random access memory (DRAM) cache module for providing temporary caching of the user data in a DRAM, a flash cache module for providing data cache in flash memory, an RAID module for providing interfaces of a redundant array of independent disks (RAID), and the like.

In some embodiments, the user may issue, for example, a command to create or change a storage object via the console 110. The control module 140 may convert the command into a respective I/O request, and send it to the data module 150. The I/O request for example may be sent to the client component 102. The client component 102 may write configuration or status information related to the storage object via the PSM 101 into the storage device 103, or read configuration or status information related to the storage object from the storage device 103. In some other embodiments, the control module 140 may directly send an I/O request for the configuration or status information to the PSM 101, for example to read respective configuration or status information from the storage device 103. In this context, the above path related to the I/O request for the configuration or status information is also referred to as "a control path."

In some embodiments, for example, the host 120 may initiate, to the data module 150, a command to read or write user data. The host 120 may be any of a physical computer, virtual machine, server and the like, which operates a user application locally or remotely. An I/O request for the user data may be sent to the client component 102, and the client component 102 may perform an I/O operation requested by the I/O request on the storage device 103, for example reading or writing respective user data from/to the storage device 103, or the like. In this context, the above path related with the I/O request for the user data is also referred to as "a data path."

In some embodiments, the storage device for example may be a RAID, on which one or more logical storage areas (such as logical unit numbers (LUNs)) may be created. In particular, on the storage device 103 may be created a private storage area (for example, a private LUN) for storing the configuration information, and a user storage area (for example, a user LUN) for the storing user data. For example, the private LUN is invisible to the user. In some embodiments, multi-image protection may be provided for data stored in the private LUN, so as to offer high availability. For example, the private LUN may be created based on RAID groups with the multi-image protection. In some embodiments, the PSM 101 may interact with a LUN on the storage device 102 using a standard I/O request packet (IRP) structure, for example, to read or write data therefrom/therein, and/or query the LUN for its configuration, or the like. In some embodiments, the PSM 101 may also support a locking/unlocking operation to support access from different controllers.

In some embodiments, the PSM 101 allows a series of modifications to the private LUN by the client component 102. The PSM 101 enables these modifications to be atomically submitted or discarded. For example, if all of a group of modifications are successfully submitted, all of the group of modifications will be updated to respective disks (for example, respective disks in the storage device 103). If any of the group of modifications fails in submission, or a fault occurs to the SP 130 before the submission, all of the group of modifications cannot be updated to respective disks. That is, the PSM 101 can ensure that the writing to the private LUN is atomic. In some other embodiments, the client component 102 may be allowed to randomly write only a small part of the PSM data area. In this case, the PSM 101 may ensure that the updates for the private LUN are atomic.

As stated above, the PSM 101 depends on the storage device 103 which acts as an actual backend storage device to persistently store the configuration and status information of the client component 102. In some embodiments, the PSM may implement the storage by providing a mechanism satisfying the following requirements:

(1) High availability. The mechanism should be highly available. This means that, even though one or more disks in the storage device 103 (for example, RAID) fail, the mechanism should ensure data integrity. This could be accomplished by a plurality of redundant storage areas or by utilization of standard RAID techniques.

(2) Administration. The mechanism should supply necessary administrative capabilities for ease of use. The mechanism should provide graphical user interface support to present and modify properties of the PSM 101. Examples of such properties may include, but are not limited to, total bytes used/available, listing of contents, formatting of unused space, and the like.

(3) Guaranteed consistency. The mechanism should guarantee consistency of the data and storage media even in the event of a run-time failure during any operation. Recovery from such a failure should not require utilization of a fix utility.

(4) Multi-user support. The mechanism should support storage and retrieval of information from multiple users, and provide separation of respective information of different users from the users' perspectives.

(5) Generality. The mechanism should make no assumption about the data that it handles.

In some embodiments, the PSM 101 may provide standard device access interfaces to be operated by the client component 102, such as interfaces for opening, closing, loading/unloading a device control entry point, etc. Additionally, in some embodiments, the PSM 101 may provide additional operation interfaces, such as interfaces for reading, writing, submitting, discarding, deleting, formatting the unused space, etc. With these interfaces, the PSM 101 may provide simple primitives for file operations to the client component 102.

In some embodiments, as stated above, in order to guarantee the performance of I/Os for configuration information, the storage device 103 may initially reserve more I/O processing capability for the I/Os for configuration information, but less I/O processing capability for the I/Os for user information. Moreover, the PSM may coordinate with the storage device 103, so as to dynamically adjust allocation of the I/O processing capability between them based on actual load levels of the I/Os for the configuration information and the I/Os for the user information.

Figure 2:
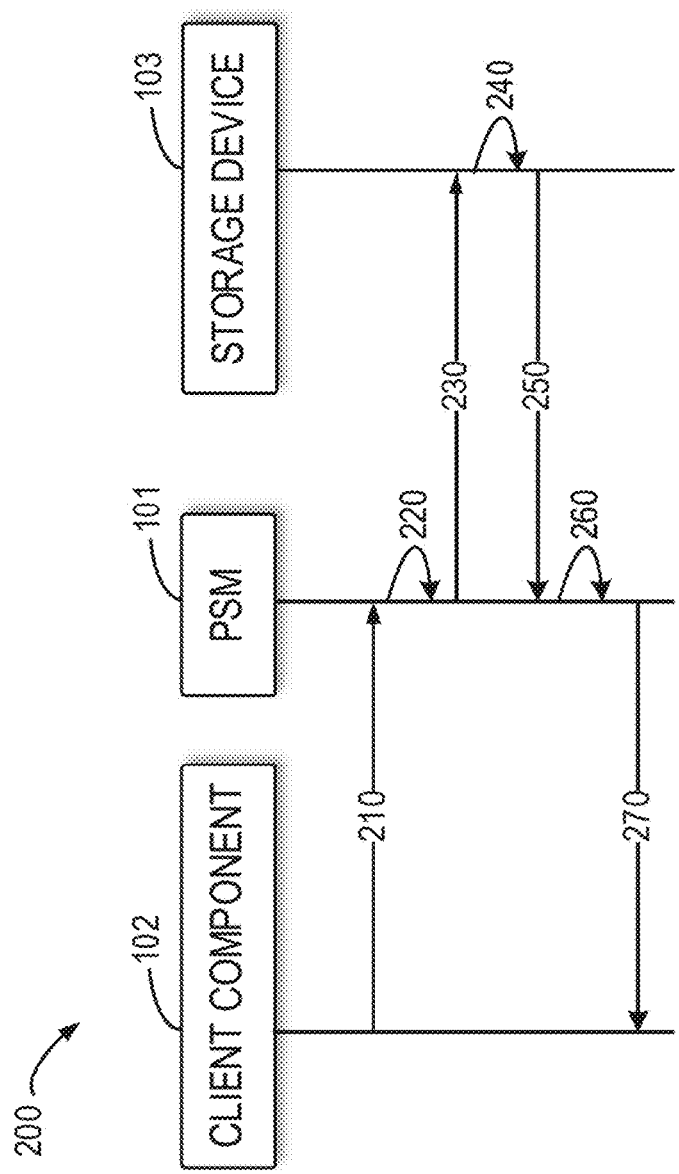
FIG. 2 illustrates a flow chart of an example process 200 for managing an I/O according to embodiments of the present disclosure.
Figure 3:
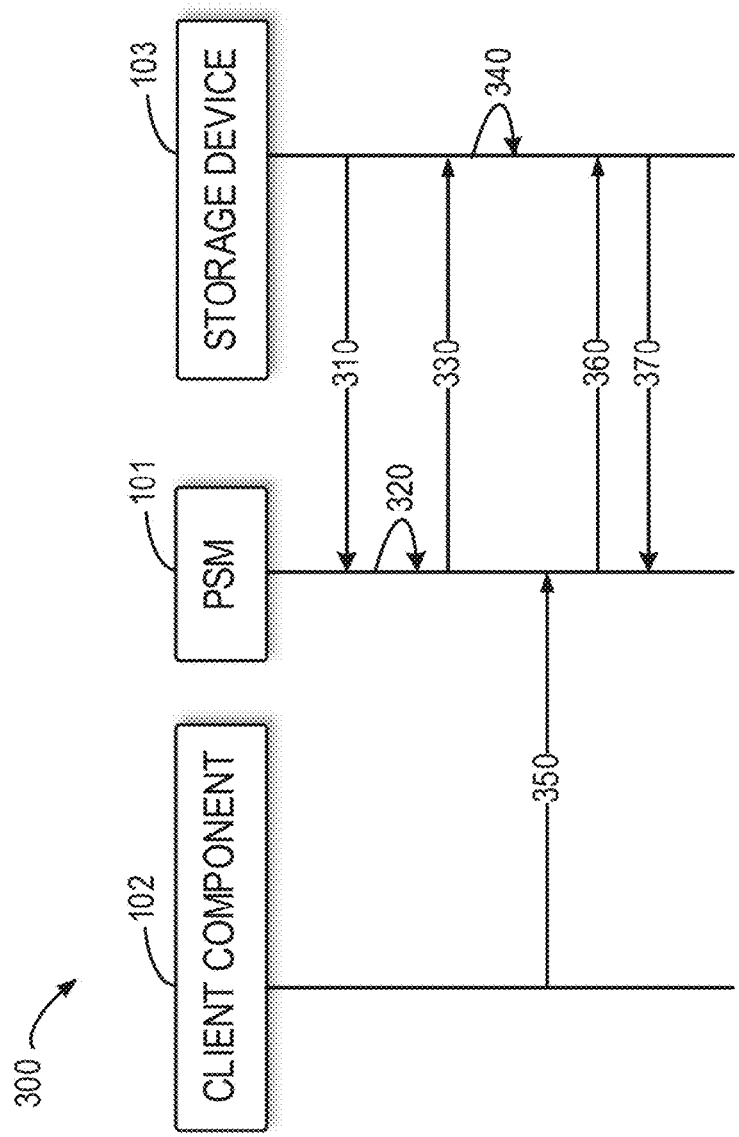
FIG. 3 illustrates a flow chart of an example process 300 for managing an I/O according to embodiments of the present disclosure.

Referring to FIGS. 2 and 3, the dynamic adjustment of the I/O processing capability will be described below in detail. FIG. 2 is a flow chart of an example process 200 for managing an I/O according to embodiments of the present disclosure. For the purpose of illustration, FIG. 2 only shows the PSM 101, the client component 102 and the storage device 103 as shown in FIG. 1. In the description about FIG. 2, RAID is taken as an example of the storage device 103, on which are created a private LUN for storing configuration information and a user LUN for storing user data. It is to be understood that this is only provided as an example without suggesting any limitation to the scope of the present disclosure.

The client component 102 may send 210 a first I/O request for configuration information to the PSM 101. In this context, the I/O requests for configuration information are also referred to as "a first type" of I/O requests.

In response to receiving the first I/O request from the client component 102, the PSM 101 may allocate 220 a first credit to the first I/O request. The "credit" as used herein indicates I/O processing capability of the storage device 103, such as a count of I/O operations that the storage device 103 can handle concurrently.

In some embodiments, in order to allocate the first credit to the first I/O request, the PSM 101 may first determine whether there is at least one credit available to the first type of I/O requests. If it is determined that there is the at least one credit, the PSM 101 may allocate the first credit from the at least one credit to the first I/O request.

In some embodiments, total I/O processing capability of the storage device 103 may be represented by a predetermined number of credits. Initially, the storage device 103 may allocate predetermined proportions of credits from the predetermined number of credits to the I/O requests for configuration information and the I/O requests for user data respectively (in this context, the I/O requests for user data are also referred to as "a second type" of I/O requests). For example, 80% of the total I/O processing capability may be reserved for the first type of I/O requests and 20% of the total I/O processing capability may be reserved for the second type of I/O requests.

For example, when the SP 130 as shown in FIG. 1 is booted up, the PSM 101 may be loaded and initiate a first device control request to the storage device 103 (for example, the PSM 101 may initiate a first device control operation IOCTL_FLARE_GET_RAID_INFO to the RAID 103) to obtain a maximum number and/or a minimum number of credits reserved by the storage device 103 for the first type of I/O requests. Meanwhile, the PSM 101 may maintain one or more variables for recording use status of the credits. For example, the PSM 101 may update at least a part of the one or more variables with the obtained maximum number and/or minimum number of credits reserved for the first type of I/O requests. The one or more variables may at least include, but are not limited to, the maximum number and/or the minimum number of credits reserved for the first type of I/O requests (which is represented by "a first variable" in the context), a number of currently remaining credits (which is represented by "a second variable" in the context), a number of uncompleted first type of I/O requests (which is represented by "a third variable" in the context), whether there are I/O requests waiting for credits (which is represented by "a fifth variable" in the context), and the like.

In some embodiments, for example, the first and the second variables may be initialized as the maximum number and/or the minimum number of credits obtained through the first apparatus control operation, the third variable and the fourth variable may be respectively initialized as certain values (for example, zero), and the fifth variable may be initialized as "false" (i.e., there is no I/O request waiting for credits in the initial condition). It is to be understood that the values (for example, zero) used herein are all exemplary, and not intended to limit the scope of the present disclosure in any manner.

In some embodiments, the PSM 101 may determine, by checking the second variable, whether there is at least one credit available to the first type of I/O requests. In some embodiments, in response to the presence of the at least one credit, the PSM 101 may allocate to the first I/O request a part of the at least one credit. Alternatively, in some other embodiments, in case that there is only one client component 102 (i.e., only one requester of the first type of I/O requests is present), the PSM 101 may allocate to the first I/O request all of the at least one credit that is determined to be present.

In some other embodiments, all the credits reserved for the first type of I/O requests have been allocated to one or more clients 102, i.e., the second variable may be zero. In this case, the PSM 101 may add the first I/O request to a waiting queue (for example, if the waiting queue is not full), to wait for recycle of the allocated credits, and update the fifth variable as "true" correspondingly (i.e., it is indicated that there are I/O requests waiting for credits). In some embodiments, if the waiting queue is full such that the first I/O request is unable to be added thereto, the PSM 101 may initiate the I/O operation (for example, sending a respective IRP) requested by the first I/O request to the storage device 103 by default without obtaining any credit. Alternatively, in this case, the PSM 101 may return, to the client component 102, an indication that the execution of the first I/O request fails.

In some embodiments, if any of the allocated credits are recycled, the second variable may be updated correspondingly to be greater than a certain value (for example, zero). In this case, the PSM 101 may take the first I/O request waiting for credits out of the waiting queue. The PSM 101 may allocate a part or all of the credits indicated by the second variable as the first credit to the first I/O request from the waiting queue. Likewise, if the waiting queue is empty after taking out the first I/O request, the PSM 101 may correspondingly update the fifth variable as "false."

In some embodiments, in response to the first credit being allocated to the first I/O request, the PSM 101 may send 230 a respective IRP to the storage device 103, to perform 240 a respective I/O operation on the private LUN in the storage device 103. In response to the I/O operation being completed, the storage device 103 may send 250 an IRP completion acknowledgement to the PSM 101. In response to receiving the IRP completion acknowledgement, the PSM 101 may recycle 260 the first credit for use by subsequent I/O requests. For example, the PSM 101 may update the second variable to indicate the recycle of the first credit. Moreover, the PSM 101 may send 270 an indication on the completion of the first I/O request to the client component.

Alternatively, or in addition, in some embodiments, the PSM 101 may change, based on the completion of the first type of I/O requests, the length of the waiting queue for the first type of I/O requests. For example, as stated above, the PSM 101 may record a number of the first type of I/O requests that have been sent to the storage device 103 but have not been completed as the third variable.

In some embodiments, the PSM 101 may determine a change trend of the third variable, and adjust the length of the waiting queue based on the determined change trend. For example, as the third variable is gradually increased to exceed a first predetermined threshold, the PSM 101 may correspondingly extend the length of the waiting queue, to enable more of the first type of I/O requests to be buffered. As the third variable is gradually decreased to be lower than a second predetermined threshold, the PSM 101 may correspondingly shorten the length of the waiting queue, to enable more of the first type of I/O requests to be executed.

Alternatively, or in addition, in some embodiments, for example when response time of the first type of I/O requests (for example, average response time as described below) exceeds a predetermined threshold or when the storage device 103 indicates execution failure of an I/O request of the first type to the PSM 101, the PSM 101 may correspondingly extend the length of the waiting queue, to enable more of the first type of I/O requests to be buffered.

These are only examples of adjusting the length of the waiting queue based on completion of the first type of I/O requests. It is to be understood that embodiments of the present disclosure can be embodied in other examples than those described above.

When the I/O load for the user LUN on the storage device 103 is heavy, the PSM may communicate with the storage device 103, such that the I/O processing capability reserved for the I/O requests directed to the private LUN can be dynamically allocated to the I/O requests directed to the user LUN.

FIG. 3 illustrates a flow chart of an example process 300 for managing an I/O according to embodiments of the present disclosure. For the purpose of illustration, FIG. 3 only shows the PSM 101, the client component 102 and the storage device 103 as shown in FIG. 1. In addition, in the description with respect to FIG. 3, RAID is taken as an example of the storage device, on which are created a private LUN for storing configuration information and a user LUN for storing user data. It is to be understood that this is only for the purpose of illustration, without suggesting any limitation to the scope of the present disclosure.

When the I/O (i.e., the second type of I/Os) load for the user LUN on the storage device 103 is heavy, the storage device 103 may initiate 310 a second device control request to the PSM 101 (for example, the storage device 103 may initiate a second device control operation IOCTL_PSM_APPLY_RESERVED_CREDIT) to the PSM 101, to borrow a second credit from the credits reserved for the first type of I/O requests to the second type of I/Os. In response to the second device control operation, the PSM 101 may determine 320 average response time of the first type of I/O requests, so as to determine whether the current performance of the I/Os for configuration information meets the expectation.

In some embodiments, the average response time may be calculated based on an arithmetic mean value of response times of all of the completed first type of I/O requests. Alternatively, in some other embodiments, the average response time may be calculated based on a weighted average value of response time of all of the completed first type of I/O requests. Specifically, a weight t (for example, 0<t<1) may be assigned to response time $x_i$ of the recently completed I/O request of the first type, a weight (1−t) may be assigned to a weighted average response time of all of the previously completed first type of I/O requests, and thus the current weighted average response time of the first type of I/O requests is: $x_{i+1}=tx_i+(1-t)X_{i-1}$. Typically, t>0.5. That is, the influence of the response time $x_i$ of the recently completed I/O request of the first type on the current weighted average response $x_{i+1}$ exceeds the influence of the weighted average response time of the historical I/O requests.

In some embodiments, the PSM 101 may further compare the determined average response time with a predetermined threshold. For example, if the determined average response time is below the predetermined threshold, it may indicate that the current performance of the I/Os for the configuration information meets the expectation. In this case, the PSM 101 may send 330 to the storage device 103 an indication on borrowing the second credit from the credits reserved for the first type of I/O requests to the second type of I/Os. In addition, the PSM 101 may correspondingly reduce the second variable and increase the fourth variable to record the borrowing of the second credit. Alternatively, in some other embodiments, although the determined average response time is below the predetermined threshold, since the average response time tends to be longer, the PSM 101 may not borrow the second credit for the second type of I/Os, in order to avoid deterioration of the performance of the I/Os directed to the configuration information.

In some embodiments, in response to receiving from the PSM 101 the indication that the second credit is borrowed to the second type of I/Os, the storage device 101 may improve 340, based on the second credit, the I/O processing capability for the I/Os directed to the user LUN. In some embodiments, the client component 102 may send 350 to the PSM 101 a request for accelerating a processing speed of the first type of I/O requests. In response to receiving the request, when the PSM 101 determines that there are credits borrowed to the second type of I/O requests (for example, when the fourth variable is greater than zero), the PSM 101 may initiate 360 a third apparatus control operation to the storage device 103 (for example, the PSM 101 may initiate a third apparatus control operation IOCTL_FLARE_RETURN_RESERVED_CREDIT to the storage device 103), to recover the credits previously borrowed to the second type of I/O requests (for example, the second credits).

Alternatively, or in addition, in some embodiments, rather than depending on a request from the client component 102, the PSM 101 may determine by itself whether the third device control operation is to be initiated, so as to recycle the credits previously borrowed to the second type of I/O requests (i.e., the act 350 may not be performed). In some embodiments, the PSM 101 may determine whether the borrowed second credit is to be recycled based on the change of the third variable. For example, as the third variable is gradually increased to exceed the first predetermined threshold, the PSM 101 may initiate 360 the third device control operation to recycle the borrowed second credit for expediting processing of the first type of I/O requests.

Alternatively, or in addition, the PSM 101 may determine whether the second credit is to be recycled based on the average response time of the first type of I/O requests, as described above. For example, when the average response time of the first type of I/O requests is gradually increased to exceed a predetermined threshold, the PSM 101 may initiate 360 the third device control operation, to recycle the borrowed second credit for expediting processing of the first type of I/O requests.

The above are only some examples illustrating that the PSM 101 determines whether the third device control operation is to be initiated to recycle the credits borrowed to the second type of I/O requests. It is to be understood that embodiments of the present disclosure can be embodied in other examples than the above ones.

In some embodiments, in response to the third device control operation, the storage device 103 may send 370 to the PSM 101 an indication on recycling the second credit previously borrowed to the second type of I/O requests. In response to receiving this indication, the storage device 103 may correspondingly increase the second variable and reduce the fourth variable, to record the recycle of the second credit. In this way, the subsequent first type of I/O requests initiated by the client component 102 can obtain more credits, to accelerate the processing of the first type of I/O requests.

It is seen from the above description that the example embodiments of the present disclosure can implement dynamic allocation of I/O processing capability for different types of I/Os. By allocating, for I/Os with lower priorities, at least part of the I/O processing capability reserved for I/Os with higher priorities if they are not busy, the solution can improve the processing performance of the I/Os for the user data stored on the same storage device as the configuration information, thereby improving the performance of the entire storage system.

Figure 4:
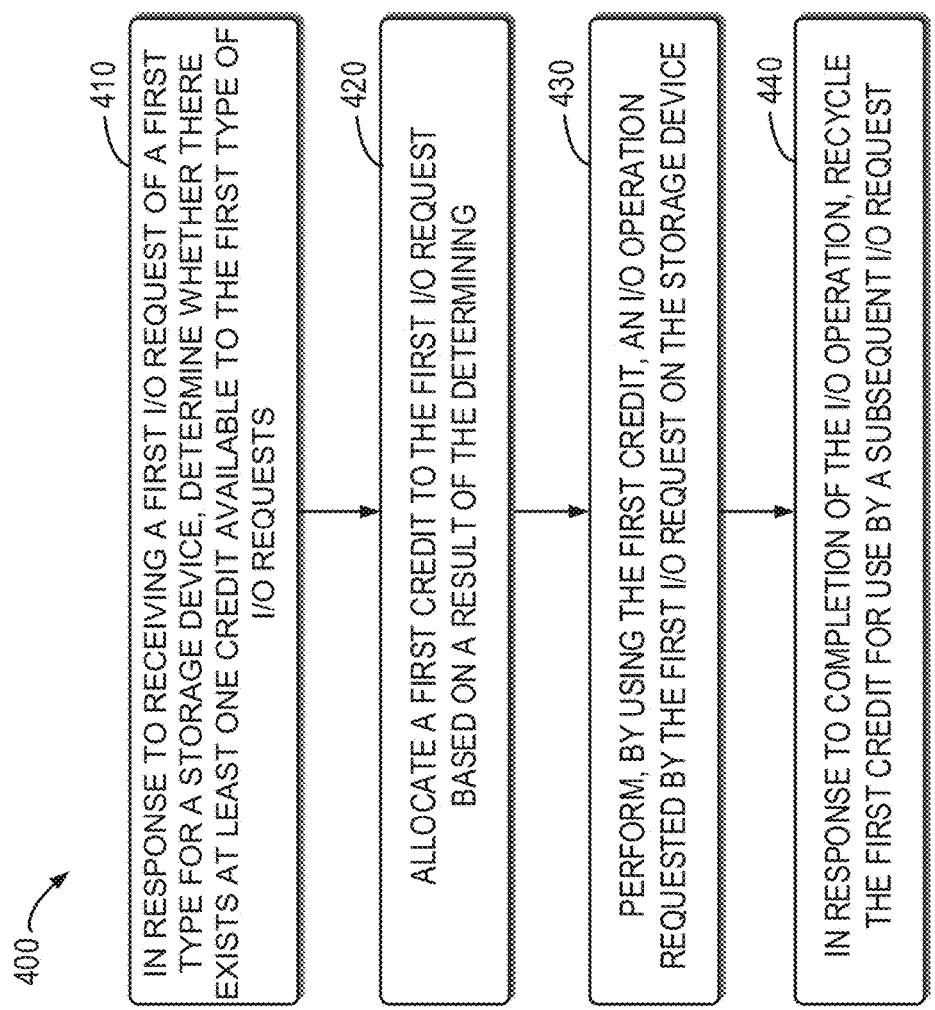
FIG. 4 illustrates a flow chart of a method 400 of managing the I/O according to embodiments of the present disclosure.

FIG. 4 is a flow chart of a method 400 for managing an I/O according to embodiments of the present disclosure. Acts involved in the method 400 will be described below with reference to FIG. 1. For example, the method 400 may be performed by the PSM 101 as shown in FIG. 1. It is to be understood that the method 400 may further include additional acts not shown and/or may omit some shown acts, and the scope of the present disclosure is not limited in these and other aspects.

At block 410, in response to receiving a first I/O request of a first type for a storage device, the PSM 101 determines whether there exists at least one credit available to the first type of I/O requests. Each of the at least one credit indicates I/O processing capability reserved by the storage device for the first type of I/O requests.

At block 420, the PSM 101 allocates a first credit to the first I/O request based on a result of the determining.

In some embodiments, in response to determining that there exists the at least one credit, the PSM 101 allocates the first credit from the at least one credit to the first I/O request.

Alternatively, in some other embodiments, in response to determining an absence of the at least one credit, the first I/O request is added to a waiting queue, to wait for one or more credits allocated to the first type of I/O requests to be recycled. Then, in response to the one or more credits being recycled, the PSM 101 allocates the first credit from the one or more credits to the first I/O request.

At block 430, the PSM 101 performs, by using the first credit, an I/O operation requested by the first I/O request on the storage device.

At block 440, in response to completion of the I/O operation, the PSM 101 recycles the first credit for use by a subsequent I/O request.

Alternatively, or in addition, in some embodiments, the PSM 101 changes a length of the waiting queue based on a result of the performing of the I/O operation.

Alternatively, or in addition, in some embodiments, in response to determining that there exists the at least one credit and receiving a first request to allocate a second credit from the at least one credit to a second I/O request of a second type, the PSM 101 determines average response time of the first type of I/O requests. Further, in response to the average response time being below a predetermined threshold, the PSM 101 allocates the second credit from the at least one credit to the second I/O request.

Alternatively, or in addition, in some embodiments, in response to receiving a second request to expedite processing of the first type of I/O requests, the PSM 101 recycles the second credit for use by a subsequent I/O request of the first type.

In some embodiments, a first priority assigned to an I/O request of the first type is higher than a second priority assigned to an I/O request of the second type.

In some embodiments, the first type of I/O requests are used for reading/writing system configuration information from/to the storage device, and the second type of I/O requests are used for reading/writing user data from/to the storage device.

In some embodiments, the storage device is a redundant array of independent disks (RAID), and the I/O processing capability is represented by a number of I/O operations that the RAID can process concurrently.

Figure 5:
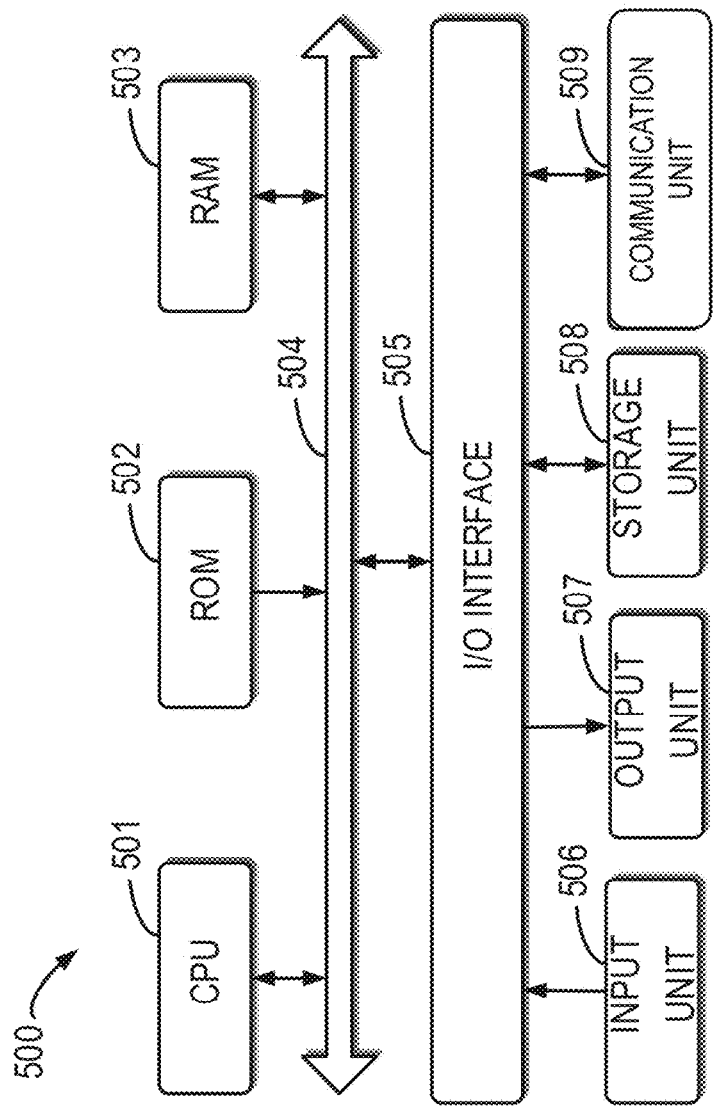
FIG. 5 is a schematic block diagram of an example apparatus 500 that can be used to implement the embodiments of the present disclosure.

FIG. 5 is a schematic block diagram of an example apparatus 500 that can be used to implement the embodiments of the present disclosure. For example, the SP 130 as shown in FIG. 1 can be implemented by the apparatus 500. As shown in FIG. 5, the apparatus 500 includes a central processing unit (CPU) 501 which may perform various appropriate actions and processing based on computer program instructions stored in the read only memory (ROM) 502 or computer program instructions uploaded from storage unit 508 to the random access memory (RAM) 503. The RAM 503 further stores various programs and data needed by operation of the apparatus 500. The CPU 501, ROM 502 and RAM 503 are connected to one another via a bus 504. The input/output (I/O) interface 505 is also connected to the bus 504.

A plurality of components in the apparatus 500 are connected to the I/O interface 505 including: an input unit 506, such as a keyboard, a mouse, and the like; an output unit 507, such as displays of various types and loudspeakers; a storage unit 508, such as magnetic disk and optical disk; a communication unit 509, such as network card, modem, wireless communication transceiver. The communication unit 509 allows the apparatus 500 to exchange data/information with other devices via computer networks, such as Internet and/or telecommunication networks.

The processes and processing described above, the method 400 for instance, can be executed by the processing unit 501. For example, in some implementations, the method 400 can be implemented as a computer software program which is corporeally contained in a machine readable medium, such as the storage unit 508. In some implementations, the computer program can be partially or wholly loaded and/or mounted on the apparatus 500 by the ROM 502 and/or the communication unit 509. When the computer program is uploaded to the RAM 503 and executed by the CPU 501, one or more steps of the method 400 described above can be executed.

Embodiments of the present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing an input/output (I/O), comprising:
   in response to receiving a first I/O request of a first type for a storage device, determining whether there exists at least one credit available to the first type of I/O requests, each of the at least one credit indicating I/O processing capability reserved by the storage device for the first type of I/O requests;
   allocating a first credit to the first I/O request based on a result of the determining;
   performing, by using the first credit, an I/O operation requested by the first I/O request on the storage device; and
   in response to completion of the I/O operation, recycling the first credit for use by a subsequent I/O request;
   wherein the storage device is a redundant array of independent disks (RAID), and wherein the I/O processing capability is represented by a number of I/O operations that the RAID is able to process concurrently.

2. The method according to claim 1, wherein allocating the first credit to the first I/O request comprises:
   in response to determining that there exists the at least one credit, allocating the first credit from the at least one credit to the first I/O request.

3. The method according to claim 1, wherein allocating the first credit to the first I/O request comprises:
   in response to determining an absence of the at least one credit, adding the first I/O request to a waiting queue, so as to wait for one or more credits allocated to the first type of I/O requests to be recycled; and
   in response to the one or more credits being recycled, allocating the first credit from the one or more credits to the first I/O request.

4. The method according to claim 3, further comprising:
   changing a length of the waiting queue based on a result of the performing of the I/O operation.

5. The method according to claim 1, further comprising:
   in response to determining that there exists at least one credit and receiving a first request to allocate a second credit from the at least one credit for a second I/O request of a second type, determining average response time of the first type of I/O requests; and
   in response to the average response time being below a predetermined threshold, allocating the second credit from the at least one credit to the second I/O request.

6. The method according to claim 5, further comprising:
   in response to receiving a second request to expedite processing of the first type of I/O requests, recycling the second credit for use by a subsequent I/O request of the first type.

7. The method according to claim 5, wherein a first priority assigned to an I/O request of the first type is higher than a second priority assigned to an I/O request of the second type.

8. The method according to claim 1, wherein the storage device is a mapped RAID.

9. An apparatus of managing an input/output (I/O), comprising:
   at least one processing unit;

at least one memory coupled to the at least one processing unit and storing instructions for execution by the at least one processing unit, the instructions, when executed by the at least one processing unit, causing the apparatus to perform acts including:

in response to receiving a first I/O request of a first type for a storage device, determining whether there exists at least one credit available to the first type of I/O requests, each of the at least one credit indicating I/O processing capability reserved by the storage device for the first type of I/O requests;

allocating a first credit to the first I/O request based on a result of the determining;

performing, by using the first credit, an I/O operation requested by the first I/O request on the storage device; and in response to completion of the I/O operation, recycling the first credit for use by a subsequent I/O request;

wherein the storage device is a redundant array of independent disks (RAID), and wherein the I/O processing capability is represented by a number of I/O operations that the RAID is able to process concurrently.

10. The apparatus according to claim 9, wherein allocating the first credit to the first I/O request comprises:

in response to determining that there exists the at least one credit, allocating the first credit from the at least one credit to the first I/O request.

11. The apparatus according to claim 9, wherein allocating the first credit to the first I/O request comprises:

in response to determining an absence of the at least one credit, adding the first I/O request to a waiting queue, so as to wait for one or more credits allocated to the first type of I/O requests to be recycled; and in response to the one or more credits being recycled, allocating the first credit from the one or more credits to the first I/O request.

12. The apparatus according to claim 11, wherein the acts further include:

changing a length of the waiting queue based on a result of the performing of the I/O operation.

13. The apparatus according to claim 9, wherein the acts further include:

in response to determining that there exists at least one credit and receiving a first request to allocate a second credit from the at least one credit for a second I/O request of a second type, determining average response time of the first type of I/O requests; and in response to the average response time being below a predetermined threshold, allocating the second credit from the at least one credit to the second I/O request.

14. The apparatus according to claim 13, wherein the acts further include:

in response to receiving a second request to expedite processing of the first type of I/O requests, recycling the second credit for use by a subsequent I/O request of the first type.

15. The apparatus according to claim 13, wherein a first priority assigned to an I/O request of the first type is higher than a second priority assigned to an I/O request of the second type.

16. The apparatus according to claim 9, wherein the storage device is a mapped RAID.

17. A computer program product comprising a non-transient computer storage medium having stored therein machine executable instructions of one or more software programs, wherein the machine executable instructions when executed by an apparatus, cause the apparatus:

in response to receiving a first I/O request of a first type for a storage device, to determine whether there exists at least one credit available to the first type of I/O requests, each of the at least one credit indicating I/O processing capability reserved by the storage device for the first type of I/O requests;

to allocate a first credit to the first I/O request based on a result of the determining;

to perform, by using the first credit, an I/O operation requested by the first I/O request on the storage device; and in response to completion of the I/O operation, to recycle the first credit for use by a subsequent I/O request;

wherein the storage device is a redundant array of independent disks (RAID), and wherein the I/O processing capability is represented by a number of I/O operations that the RAID is able to process concurrently.

18. The computer program product according to claim 17, wherein allocating the first credit to the first I/O request comprises:

in response to determining that there exists the at least one credit, allocating the first credit from the at least one credit to the first I/O request.

19. The computer program product according to claim 17, wherein allocating the first credit to the first I/O request comprises:

in response to determining an absence of the at least one credit, adding the first I/O request to a waiting queue, so as to wait for one or more credits allocated to the first type of I/O requests to be recycled; and in response to the one or more credits being recycled, allocating the first credit from the one or more credits to the first I/O request.

20. The computer program product according to claim 17, wherein the storage device is a mapped RAID.

* * * * *